United States Patent [19]

Cecil

[11] Patent Number: 4,684,778
[45] Date of Patent: Aug. 4, 1987

[54] RESISTANCE SPOT WELDING GUN AND TRANSFORMER ASSEMBLY

[76] Inventor: Dimitrios G. Cecil, 1277 Ashover Dr., Bloomfield Hills, Mich. 48013

[21] Appl. No.: 605,563

[22] Filed: Apr. 30, 1984

[51] Int. Cl.⁴ ............................................. B23K 11/32
[52] U.S. Cl. .................... 219/89; 219/86.41; 219/91.1; 219/116; 901/42
[58] Field of Search ............... 219/116, 86.21, 86.25, 219/86.41, 86.51, 86.33, 86.8, 89, 91.1; 901/42

[56] References Cited

U.S. PATENT DOCUMENTS

| | | | |
|---|---|---|---|
| 2,063,257 | 12/1936 | Martin | 219/89 |
| 2,244,508 | 6/1941 | Von Henke et al. | 219/89 |
| 2,299,247 | 1/1967 | Waltonen | 219/89 |
| 2,349,835 | 5/1944 | Strickland, Jr. | 219/89 |
| 2,471,881 | 5/1949 | Manning et al. | 219/86.21 |
| 2,650,977 | 9/1953 | Welch | 219/86.41 |
| 3,136,879 | 6/1964 | Waltonen | 219/89 |
| 3,270,604 | 9/1966 | Waltonen | 83/140 |
| 3,396,260 | 8/1968 | Waltonen | 219/89 |
| 3,654,616 | 4/1972 | Dunne et al. | 901/42 |
| 4,098,161 | 7/1978 | Bloch | 83/519 |

*Primary Examiner*—Clifford C. Shaw
*Attorney, Agent, or Firm*—Burton, Parker & Schramm

[57] ABSTRACT

An assembly is provided for mounting on an end of a robot arm actuator as an integral spot resistance welding gun and transformer unit. A gun slide support bracket is connected to the transformer and serves to provide a mount for a sliding gun cylinder having a piston connected to one of the jaw electrodes. The lower jaw is removably connected to the cylinder. Roller shunts are used to provide electrical connection between secondary terminals on the transformer and the two electrodes. A proximity switch assembly is advantageously utilized to provide signals to the robot controller indicating a fully retracted position of the jaws.

7 Claims, 9 Drawing Figures

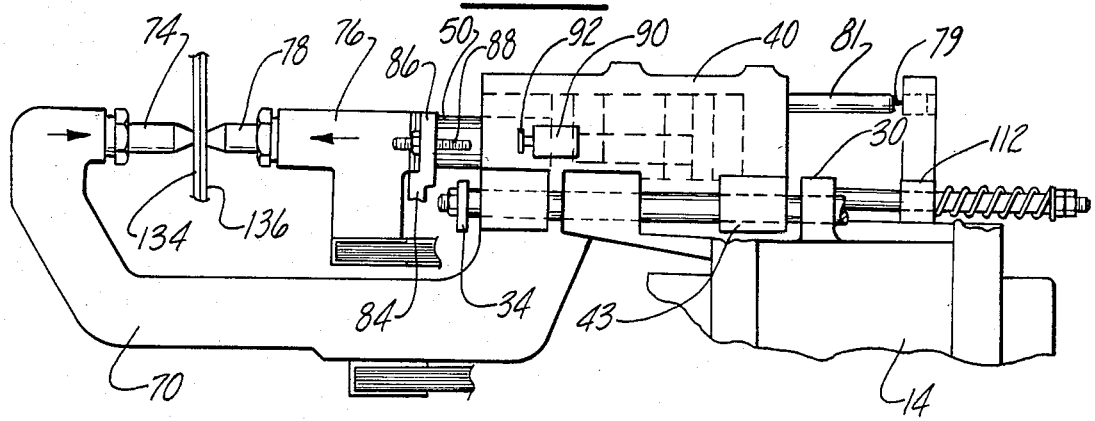
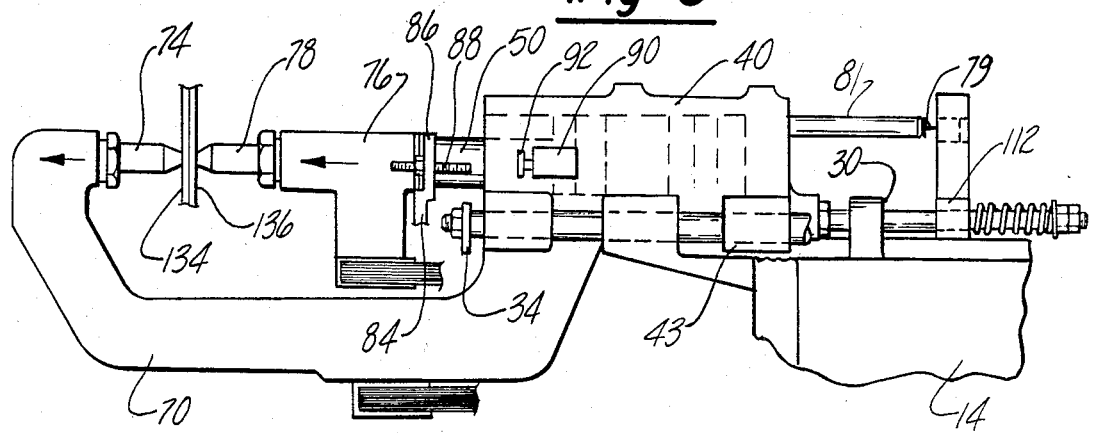
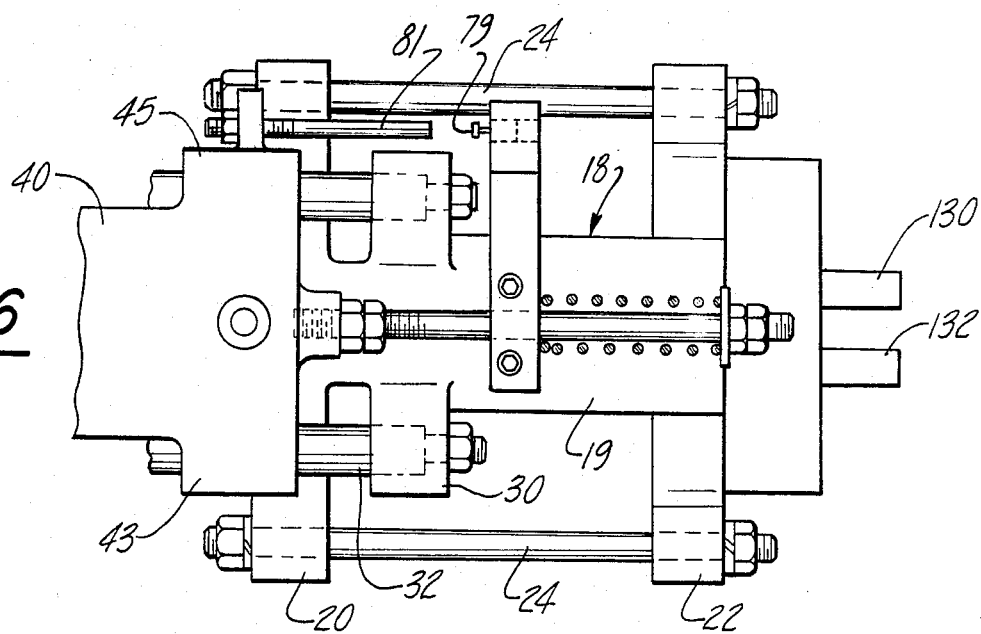

4,684,778

RESISTANCE SPOT WELDING GUN AND TRANSFORMER ASSEMBLY

DESCRIPTION

1. Technical Field

This invention relates to welding guns and, more particularly, to resistance spot welding guns adapted to be used on the end of a robot arm actuator.

2. Background Art

Automated machines are being increasingly used to perform tedious and labor consuming tasks. One such machine is commonly known as an industrial robot which operates under computer control to perform various operations. Robots are particularly adapted for performing spot resistance welding operations on metal parts. A welding gun is typically attached to the wrist or actuator on the end of the robot arm. The robot controller is used to move the gun to the desired location and to actuate the gun jaws to make the weld.

Spot resistance welding guns require an extremely large amount of current in order to make a good weld. The current is typically generated from a power transformer whose secondary is connected to electrodes on the gun jaws. It has been conventional practice to mount the transformers remotely from the gun. Typically, the transformers are mounted on overhead gantries and long lengths of heavy secondary cables are strung from the transformers to the electrodes of the gun. Unfortunately, the cables have a tendency to wear and can become entangled unless certain precautions are taken. In addition, a substantial amount of power is lost due to the long lengths of the secondary cables thus requiring increased power capacity from the transformer to overcome the losses. Normally, this has required the use of relatively heavy and bulky transformers.

In these types of automated systems where there is no direct operator intervention it is extremely important that the devices operate properly. Unfortunately, the gun electrode jaws sometimes stick together and do not fully retract. Consequently, when the robot moves the gun to the next position the electrodes may damage the part or become damaged themselves.

From a manufacturer's standpoint it would be highly desirable to provide a spot resistance weld gun assembly that may be easily adapted for various customer requirements without requiring substantial modification of the basic unit. Different customer applications may require a variety of different stroke distances or jaw configurations. Most known gun units have not lent themselves to easy adaptability.

It is also important to insure that the gun electrodes do not deform the metal when actually making the weld. Self-equalizing welding guns are known for this purpose. Representative examples of such guns are disclosed in U.S. Pat. Nos. 3,136,879; 3,270,604; 3,396,260 and to a lesser extent the apparatus disclosed in U.S. Pat. No. 4,098,161. Their particular constructions, however, do not lend themselves to incorporation of the various features of the present invention as will be described herein.

SUMMARY OF THE INVENTION

The apparatus of the present invention incorporates several unique design features that may be used alone or in combination. One feature is the overall design of an integral unit containing both a self equalizing spot welding gun and transformer which is adapted to be mounted to the end of a robot arm actuator. The gun includes a cylinder mounted for reciprocating movement on a support bracket adjacent the transformer. One of the jaws is preferably removably attached to the cylinder to permit the use of interchangeably different jaw configurations. The other electrode is connected to a piston operated under pneumatic pressure applied to the cylinder. Flexible electrical connectors, preferably rolling shunts, are used to connect each electrode to respective terminals on the transformer. The unit is characterized by its lightweight and compact shape eliminating the use of conventional secondary cables and the problems associated therewith. One particular advantage is that power losses are minimized since the construction of the present invention enables power to be delivered to the electrodes within a short distance from the transformer while at the same time permitting relative movement of the electrodes. Another advantage is that the basic unit can be easily adapted for different stroke distances or jaw configurations without substantial modifications.

According to another aspect of this invention, means are provided for generating an electrical signal indicating a fully retracted position of the gun jaws. Such a signal can be coupled to the robot controller and used to prevent further movement of the arm until the problem can be corrected thereby avoiding damage to both the part and the welding apparatus.

BRIEF DESCRIPTION OF THE DRAWINGS

These and various other advantages of the present invention will become apparent to one skilled in the art after reading the following specification and by reference to the drawings in which:

FIG. 6 is a top plan view of rear portions of the apparatus;

FIG. 7 is a simplified side view of the apparatus during one stage of its operational cycle;

FIG. 8 is a view similar to FIG. 7, showing the self-equalizing function of the apparatus;

DESCRIPTION OF THE PREFERRED EMBODIMENT

Figure 1:
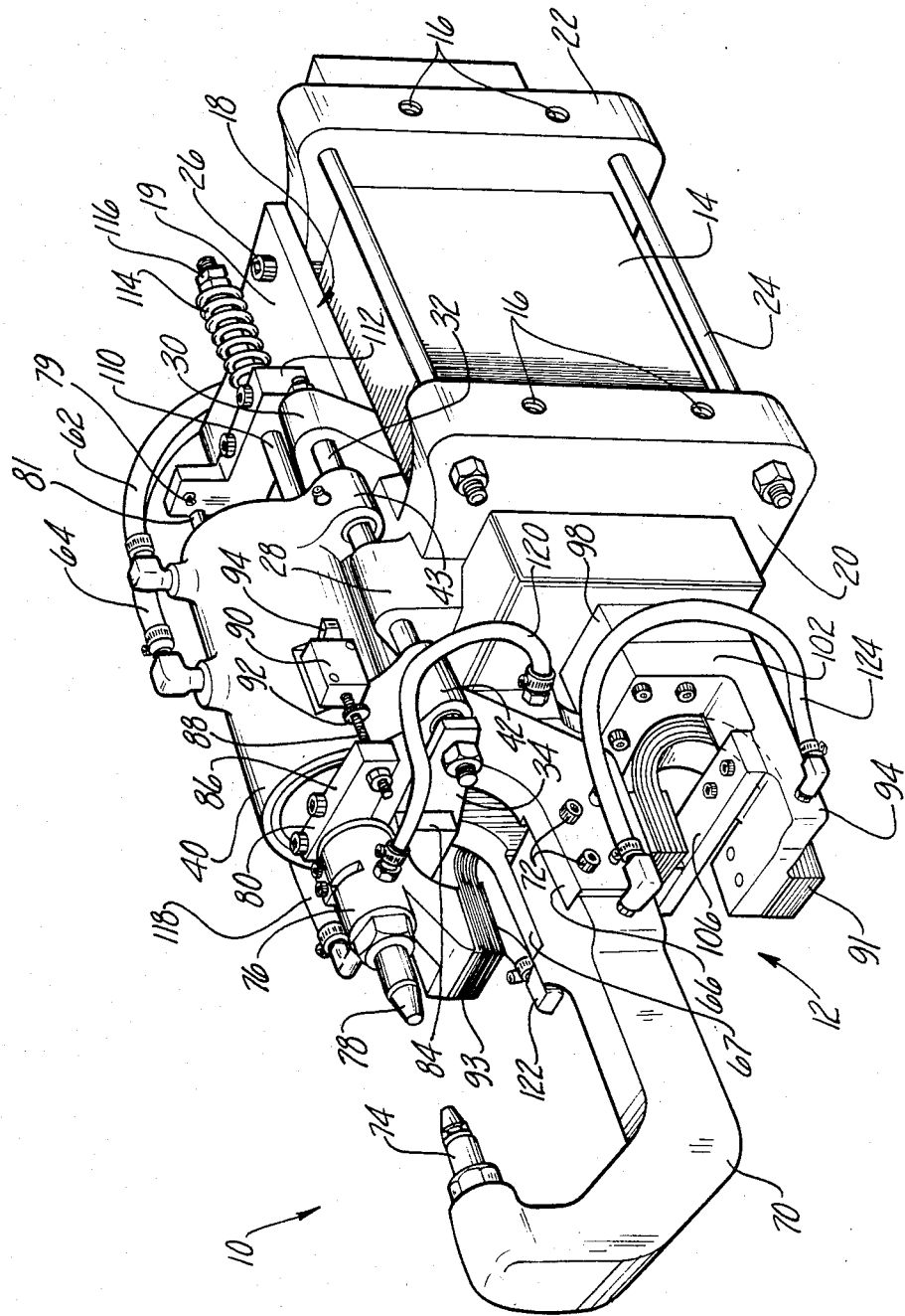
FIG. 1 is a perspective view of welding apparatus made in accordance with the teachings of this invention.

FIGS. 1-6 illustrate welding apparatus 10 in a steady state condition, i.e., with no actuating pressure applied. Apparatus 10 incorporates a resistance spot welding gun 12 and an associated transformer 14 which are connected together to form a lightweight and compact unit. The transformer 14 illustrated in this embodiment is connected to the gun 12 by a bracketing arrangement particularly adapted for this type of transformer. The apparatus 10 may be conveniently mounted on the end of a robot arm actuator by suitable means employing fasteners or the like screwed into mounting holes 16 in the bracket arrangement. The bracket arrangement of this embodiment includes a generally T-shaped support bracket 18 with a top portion 19 and a downwardly extending portion 20 serving as a forward faceplate abutting one end of transformer 14.

The horizontally extending top portion 19 of bracket 18 includes a rearward section bridging transformer 14. The rearward end of transformer 14 is abutted by an end plate 22 drawn towards plate 20 by way of mounting studs 24. The rearward end of bracket portion 19 is secured to plate 22 by cap screw 26. Thus, it can be appreciated that the arrangement just described operates to serve as a frame for securely mounting transformer 14. By way of a nonlimiting example, transformer 14 is a 31 KVA transformer operating on 440 volts, 60 hertz, single phase input applied to its primary coil. Such a transformer is available as model No. S-1954 from Marsden Electronics. As will appear (see FIG. 9) the bracketing arrangement can vary in design depending on the type of transformer that is used.

Each side of the top bracket portion 19 includes a pair of spaced ears 28, 30 and 29, 31. The ear pairs 28, 30 and 29, 31 have concentric holes formed therein for receipt of guide shafts 32, 33, respectively. The forward ends of shafts 32, 33 are received and mounted to a transversely extending fixed piston rod stop guide 34. The rearward ends of guide shafts 32, 33 are secured to ears 30 and 31, respectively.

A pneumatically operated cylinder 40 is mounted for reciprocating movement along guide shafts 32 and 33. Each of the lower sides of cylinder 40 includes a pair of radially outwardly projecting legs 42, 43 and 44, 45. Each leg is included with brass bushings therein to insure smooth travel about the guide shafts.

Figure 5:
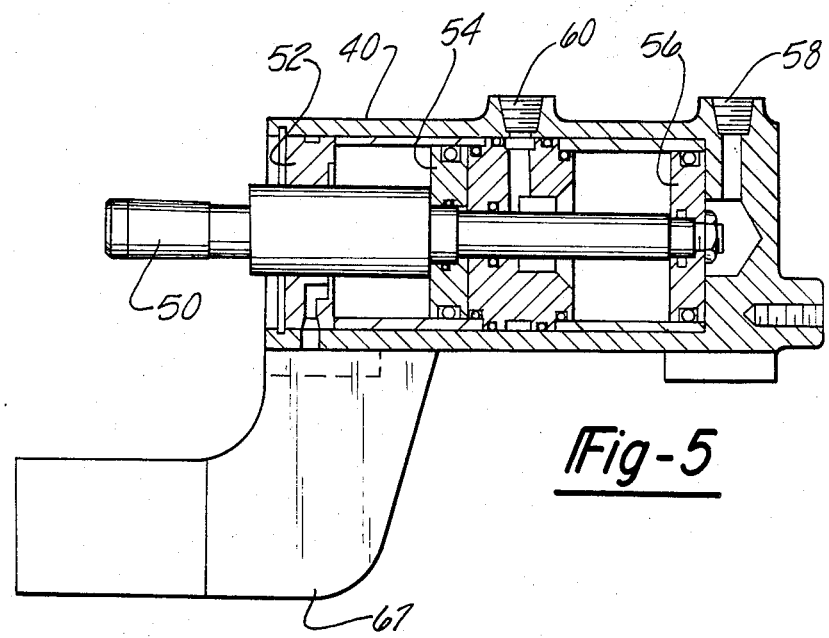
FIG. 5 is a view taken along the lines 5—5 of FIG. 3.

The internal structure of cylinder 40 is shown most clearly in FIG. 5. A piston rod 50 is guided for axial movement in cylinder 40 by a bearing 52. The internal ends of piston rod 50 are connected to dual piston heads 54 and 56. Fluid pressure such as compressed air applied to inlet port 58 urges rod 50 leftwardly whereas pressure applied to port 60 returns rod 50 to its home position as shown in FIG. 5. As shown in FIG. 1 such fluid pressure may be applied by way of hoses 62 and 64 connected to a suitable source of external air pressure.

A pair of curved forks 66, 67 project forwardly from the belly of cylinder 40. Pursuant to a feature of this invention, a lower gun jaw 70 is removably attached to the cylinder forks 66, 67. This is accomplished by way of a plurality of cap screws 72. In the embodiment shown in these drawings gun jaw 70 is generally C-shaped. However, other configurations can be accommodated by the apparatus of this invention. The end of jaw 70 includes an electrode 72 which is generally concentric with the cylinder piston rod 50.

Piston rod 50 is connected to a holder defining an upper gun jaw 76 to which a second electrode 78 is mounted opposing electrode 74. As will be described later herein, by this arrangement electrode 78 will generally follow the movement of piston rod 50 whereas electrode 74 follows the travel of cylinder 40 to which it is connected.

A piston rod stop collar 80 is clamped by way of cap screws 82, 83 to piston rod 50 between holder 76 and cylinder 40. Stop collar 80 includes a lower offset lip portion 84 adapted to abut stop guide 34 when the electrodes 74, 78 are fully opened.

Pursuant to a feature of this invention stop collar 80 includes an arm portion 86 extending transversely to the axis of piston rod 50. An actuator mechanism which may simply take the form of a threaded stud 88 is mounted to the end of arm 86 in such manner so as to extend rearwardly outside of the extremeities of cylinder 40. A limit or proximity switch assembly 90 is mounted on the outer forward side of cylinder 40. Switch 90 may take a variety of forms, magnetic proximity switches being presently preferred. In the drawings, switch 90 is shown as having a contact member 92 that operates to change the electrical characteristics of the switch when contacted by stud 88. A suitable connection 94 is provided for connecting the output of switch 90 to the robot controller (not shown). Switch 90 is of the normally open type. Another proximity switch 79 (this one being normally closed) is fixed to a stationary member located towards the rear of cylinder 40. A second actuator stud 81 is mounted on the rearward side of cylinder 40 and moves with it.

When the gun jaws are fully open the stud 88 presses against the contact member 92 of switch 90 and stud 81 is spaced from switch 79 thereby signaling to the controller that the gun is in a condition to be moved to its next weld location. If, however, the gun jaws stick in a closed condition or are prevented from fully opening, the stud 88 is displaced from the limit switch 90 or stud 81 remains in contact with switch 79 thereby failing to generate the requisite signals. The provision of this feature of the invention insures that the apparatus 10 is not moved to another location under such conditions that may cause damage to the part or to the electrodes.

Electrical connection between the transformer 14 and electrodes 74 and 78 are made by a pair of rolling shunt assemblies 91 and 93, respectively. Each of the shunts resemble U-shaped leaf springs and consists, in this embodiment, of 50 pieces of 7.75 to 9.75 inch lengths of copper which are about 1.5 inch wide and 0.010 inch thick. The lower portions each shunts 91, 93 are affixed to stationary bus bars 94 and 96, respectively. Bus bar 94 is electrically connected to a transformer secondary terminal 98. Similarly, bus bar 96 is electrically connected to another transformer terminal 100. The bus bars 94 and 96 each include rearward flanges 102 and 104, respectively, which are screwed into the block like terminals extending through faceplate 20. An insulator support bar 106 may be provided, if desired, to minimize stresses in the rolling shunts.

The upper end of shunt 91 is screwed into lower portions of electrically conductive jaw 70. The upper end of shunt 93 is similarly connected to lower portions of the upper jaw, more particularly, to electrically conductive holder 76. The U-shaped shunts are adapted to flex and follow their respective jaws when they move. Thus, they provide flexible connections that are capable of carrying large amounts of current while lending themselves to the overall compact design objective. Since the electrodes are located very close to the output terminals of the transformer, power losses are kept to a minimum.

The rearward portion of cylinder 60 has a shaft 110 screwed into it. Shaft 110 passes through a stop 112 attached to top portion 19 of support bracket 18. A spring 114 surrounds rearward portion of shaft 110. The compression on spring 114 is controlled by lock nuts 116.

Preferably, the current carrying components of the apparatus 10 are cooled by water circulating therethrough via hoses 118–124.

The operation of the apparatus 10 will now be described. The apparatus 10 is mounted on the end of robot arm actuator as previously described by way of mounting holes 16. Connection with a water circulating source is made via the hoses and power cables are connected to the primary of transformer 14 by way of pins 130 and 132. Additionally, cylinder hoses 62 and 64 are connected to the controlled pneumatic source.

Figure 2:
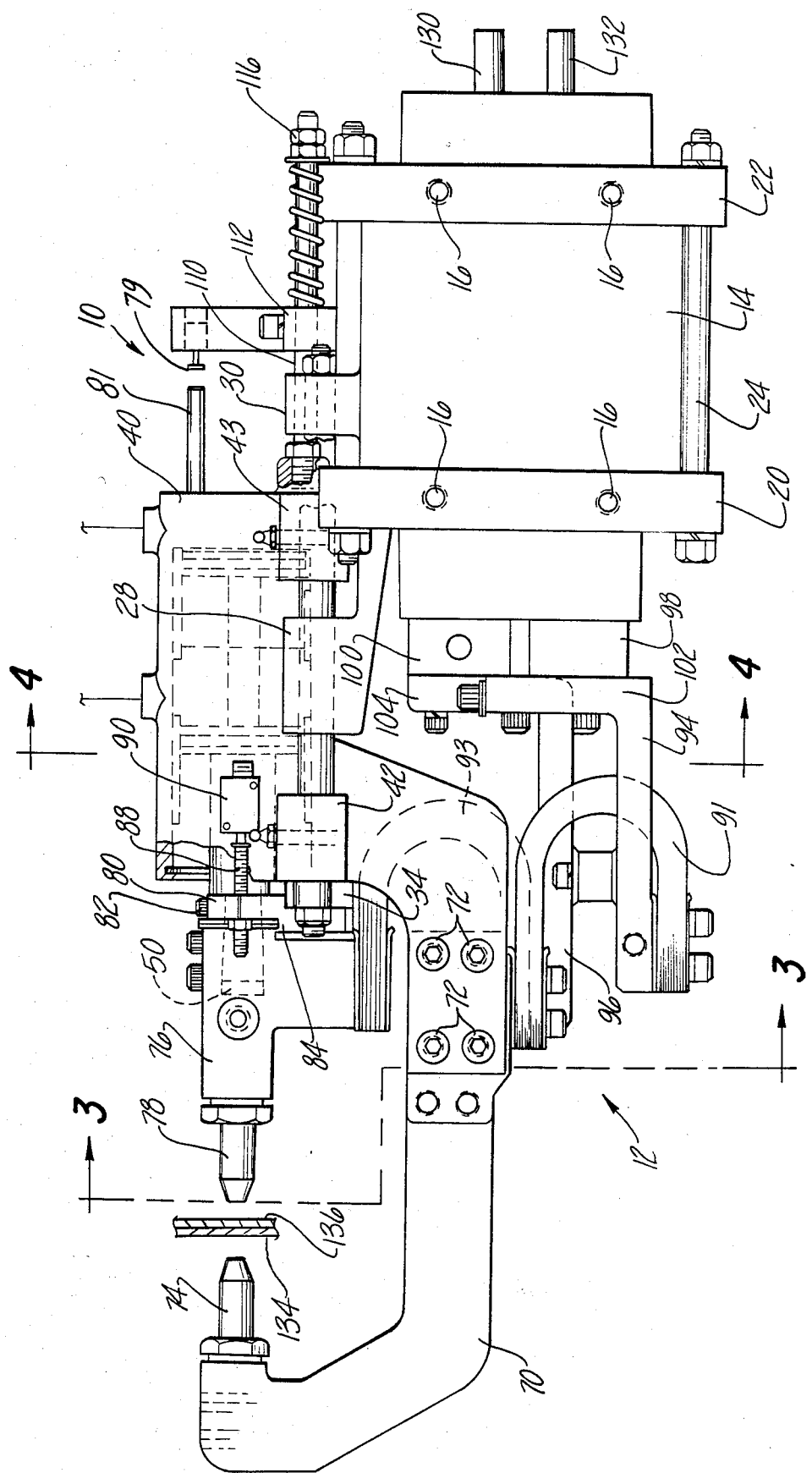
FIG. 2 is a side view thereof with parts in cross section.
Figure 3:
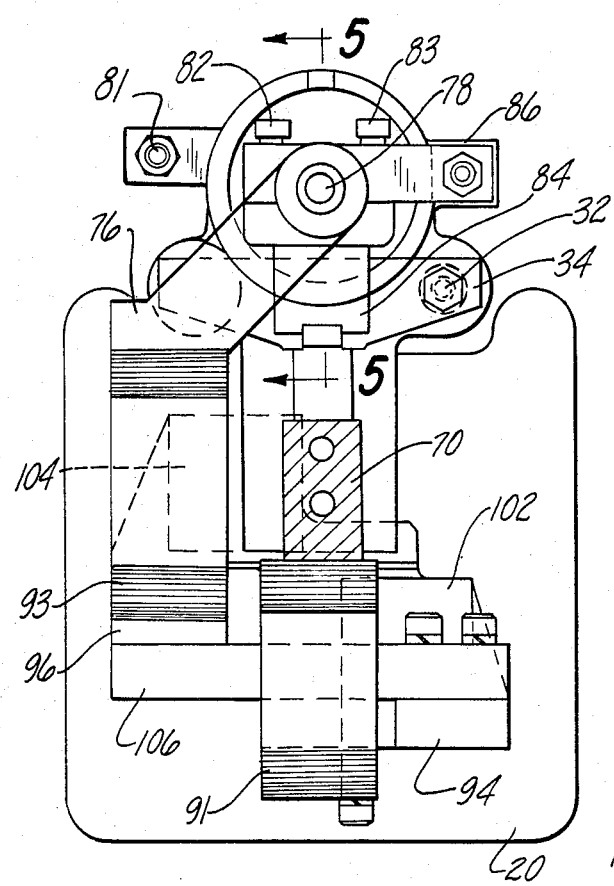
FIG. 3 is a view taken along lines 3—3 of FIG. 2.
Figure 4:
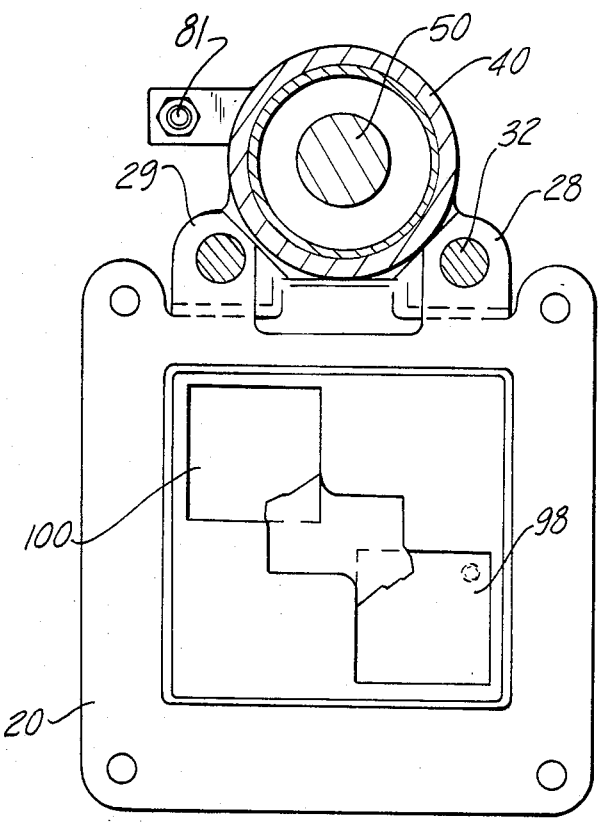
FIG. 4 is a view taken along lines 4—4 of FIG. 2.

The robot arm is actuated to move the apparatus 10 so that the electrodes 74 and 78 are on either side of the workpiece as generally shown in FIG. 2. The workpiece is represented as two metal sheets 134 and 136.

After the apparatus has been initially positioned, air pressure is applied to inlet port 58 via hose 62. As illustrated in FIG. 7 this causes several things to happen. The pressure applied to piston head 56 causes piston rod 50 and thus electrode 78 to move outwardly toward the left. In addition, the sliding cylinder 40 undergoes an opposite reaction whereby it slides to the right. Since the jaw 70 is connected to cylinder 40, electrode 74 also moves rightwardly until it contacts workpiece sheet 134. Piston rod 50 continues its outward movement to bring electrode 78 into diametrically opposing relationship with electrode 74.

The pressure applied to the workpiece by the electrodes 74 and 78 may be controlled by the setting of the tension on spring 114 provided by way of the adjustable lock nuts 116. The apparatus is designed to have a self-equalizing effect maintaining the desired pressure on the workpiece. As shown in FIG. 8, any overtravel of electrode 78 is compensated by the fact that gun jaw 70, together with cylinder 40, may move leftwardly to relieve undue pressure on the workpiece which otherwise may occur. In such manner, deformation of the workpiece is avoided even where the two parts are relatively thin sheets of material.

Power is then applied by the robot controller and supplied via rolling shunts 91 and 93 to their respective electrodes 74 and 78 to form the weld. As can be seen in FIGS. 7 and 8, stud 88 does not contact switch 90 but stud 81 contacts switch 79 when the jaws are closed. After the weld is finished, air pressure is applied to the cylinder port 60 causing piston rod 50 to move rightwardly. When stop collar 80 contacts stop guide 34 then cylinder 40 is urged leftwardly to displace electrode 74 from the workpiece and return the components to their home position as shown in FIG. 2. When the jaws are fully retracted the stud 88 contacts limit switch 90 and stud 81 is displaced from switch 79 thereby providing the necessary signals to the controller indicating that the jaws are fully retracted and the robot may be moved to bring the apparatus 10 to the next welding position. If either of the jaws fail to retract, this condition will be detected and the robot will not move the gun until corrective action is taken.

Figure 9:
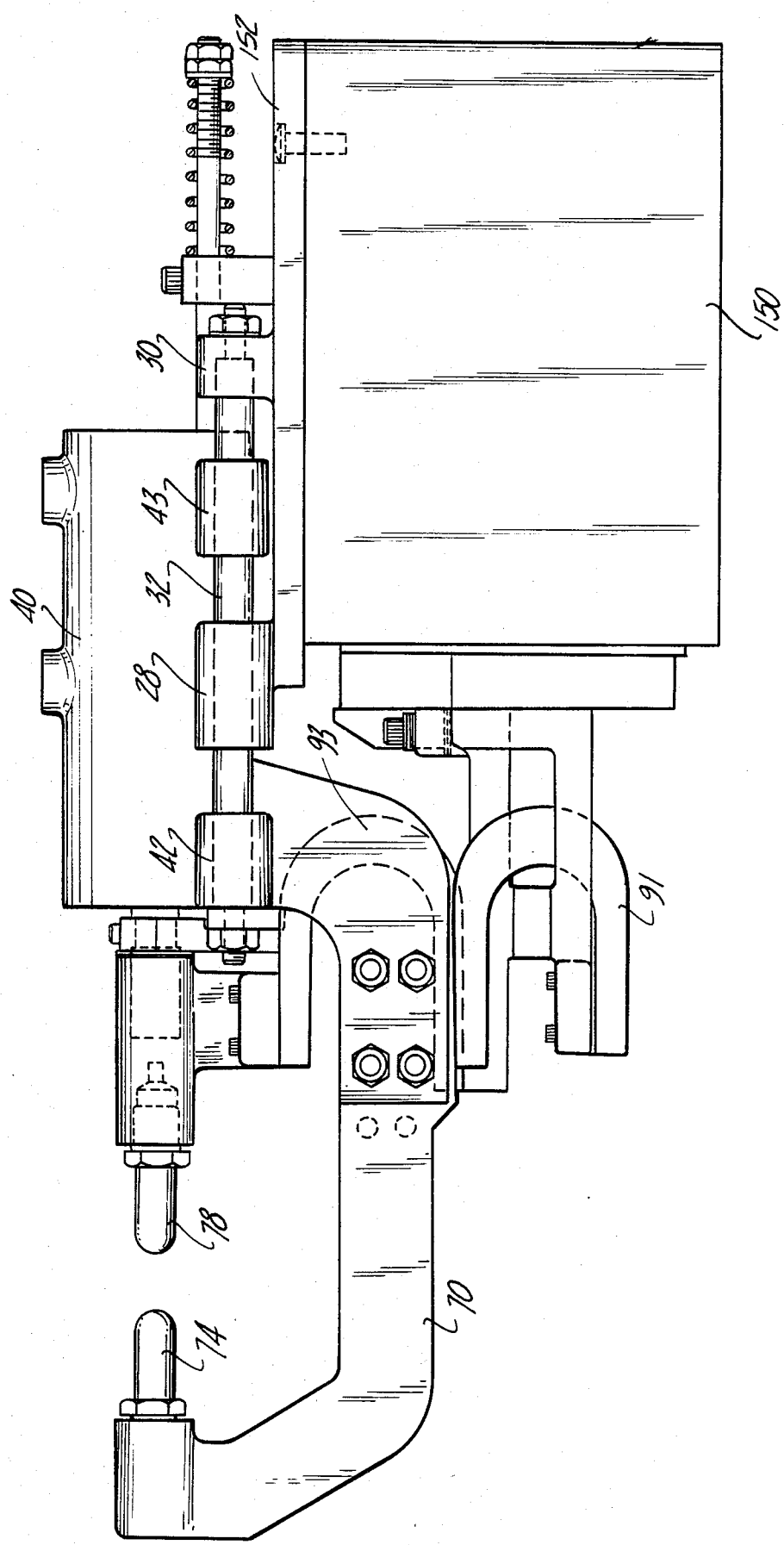
FIG. 9 is a side view similar to FIG. 2 but showing a presently preferred transformer and bracket arrangement therefor.

FIG. 9 illustrates an alternative bracket and transformer arrangement that is presently preferred. Here, a Goodrich 22 KVA transformer 150 is employed. The bracket 152 is similar to the bracket arrangement of the previous embodiment but does not include the face plate 20 or rear end plate 22. Instead, its lower surface is mounted directly to the top of the transformer 150. Bracket 152 can be of sufficient length so that it can be used on a variety of different transformer configurations with but little modification. Otherwise, the embodiment of FIG. 9 is generally the same as that described in connection with the previous embodiment except that the jaw retraction limit switches are not shown.

Those skilled in the art should now appreciate the various advantages of the construction of the apparatus just described. Various modifications will become apparent to the skilled practitioner upon a study of the specification, drawings and the following claims.

What is claimed is:

1. Resistance welding apparatus comprising:
   a transformer;
   a bracket connected to the transformer and including a pair of ears projecting upwardly from lateral sides thereof;
   two guide shafts, one each connected to each pair of ear projections on the bracket;
   a cylinder having leg portions extending from sides thereof slidably mounted on said guide shifts, and a pneumatically actuated piston rod in the cylinder;
   a first jaw member removably attached at one end to the cylinder, and a first electrode connected to an opposite end of the first jaw member;
   a second jaw member connected at one end to the piston rod and a second electrode connected to an opposite end of the second jaw member;
   first and second U-shaped rolling shunts, the first shunt being connected between a transformer secondary terminal and the first jaw, the second shunt being connected between another transformer secondary terminal and the second jaw; and
   spring means connected to a rear end of the cylinder for adjusting pressure developed between the two electrodes.

2. The apparatus of claim 1 wherein said first and second jaw members are water cooled.

3. In a resistance welding gun having a pair of electrodes movable between a first welding position and a second retracted position, the improvement comprising:
   a slidable cylinder having a piston rod therein connected to one of the electrodes, with the other electrode being connected to the cylinder; and
   sensor means for detecting failure of the electrodes to return to their retracted position after welding, said sensor means including first switch means on the cylinder, first actuator means moving with the piston rod for contacting the first switch means when one of the electrodes has been retracted, a second switch means mounted at a fixed location, and second actuator means mounted to the cylinder adapted to become displaced from the second switch means when the other electrode has been retracted; and
   means for connecting the welding gun to an automatic positioning device whose position is controlled by an external controller;
   whereby signals from the first and second switch means can be used by the external controller to prevent repositioning of the gun if the electrodes do not retract.

4. The improvement of claim 3 wherein the first switch is of the normally open type and the second switch is of the normally closed type.

5. Resistance welding apparatus adapted to be mounted on a robot arm actuator, said apparatus comprising:
   a transformer;
   bracket means connected to the transformer and supporting a cylinder slidably mounted thereon, said cylinder including a pneumatically actuated piston rod therein;

a pair of electrodes, one of the electrodes being connected to the cylinder and another electrode being connected to the piston rod;

flexible connector means for electrically connecting said transformer to said electrodes;

sensor means for detecting when the electrodes are in a retracted position whereby said signal may be used by a robot controller as precautionary criteria prior to moving the apparatus to a different weld position;

said sensor means includes first switch means mounted on the cylinder adapted to be connected by a first actuator member moving with the piston rod when one electrode is in a retracted position, and a second actuator mounted on the cylinder adapted to become displaced from a second fixed switch means when the other electrode is in a retracted position.

6. Resistance welding apparatus adapted to be mounted on a robot arm actuator, said apparatus comprising:

a transformer;

bracket means connected to the transformer and supporting a cylinder slidably mounted thereon, said cylinder including a pneumatically actuated piston rod therein;

a pair of electrodes, one of the electrodes being connected to the cylinder and another electrode being connected to the piston rod;

flexible connector means for electrically connecting said transformer to said electrode;

wherein said bracket means includes: a generally T-shaped bracket having a first portion to which said cylinder is mounted and having a transversely extending second portion serving as a faceplate abutting one end of said transformer;

further including legs on said cylinder, a pair of guide shafts onto which said cylinder legs are slidably mounted, and fixed ear projections on said bracket to which said guide shafts are attached.

7. Resistance welding apparatus adapted to be mounted on a robot arm actuator, said apparatus comprising:

a transformer;

bracket means connected to the transformer and supporting a cylinder slidably mounted thereon, said cylinder including a pneumatically actuated piston rod therein;

a pair of electrodes, one of the electrodes being connected to the cylinder and another electrode being connected to the piston rod;

flexible connector means for electrically connecting said transformer to said electrodes; and a stud connected at one end to rearward portions of the cylinder, a stop member attached to the first portion of the bracket through which said stud is adapted to pass, a spring surrounding said shaft having an end abutting said stop, and adjustment means on the opposite end of the stud for adjusting the tension in the spring.

* * * * *